(12) United States Patent
Shim (10) Patent No.: US 7,778,639 B2
(45) Date of Patent: Aug. 17, 2010

(54) NETWORK-INITIATED AREA EVENT TRIGGERED POSITIONING METHOD FOR ROAMING TERMINAL IN MOBILE COMMUNICATION SYSTEM

(75) Inventor: Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 681 days.

(21) Appl. No.: 11/783,202

(22) Filed: Apr. 6, 2007

(65) Prior Publication Data

US 2007/0238458 A1 Oct. 11, 2007

Related U.S. Application Data

(60) Provisional application No. 60/789,609, filed on Apr. 6, 2006, provisional application No. 60/795,184, filed on Apr. 27, 2006, provisional application No. 60/810,631, filed on Jun. 5, 2006, provisional application No. 60/836,938, filed on Aug. 11, 2006.

(30) Foreign Application Priority Data

Feb. 5, 2007 (KR) ...................... 10-2007-0011578

(51) Int. Cl.
*H04M 3/00* (2006.01)
*H04W 4/00* (2009.01)
*H04W 24/00* (2009.01)

(52) U.S. Cl. .................... 455/433; 455/418; 455/432.1; 455/432.3; 455/456.1; 455/456.2; 455/456.3

(58) Field of Classification Search ... 455/404.1–404.2, 455/410–411, 414.1, 414.3, 415, 418–421, 455/422.1, 432.1–432.3, 433–434, 435.1–435.3, 455/436–440, 447, 456.1–456.6, 466, 524–525, 455/550.1, 552.1, 556.2, 560–561, 423–425, 455/457; 709/202–203, 228–229; 340/539.1, 340/539.11, 539.13, 825.36, 825.49

See application file for complete search history.

(56) References Cited

U.S. PATENT DOCUMENTS 7,149,504 B1 * 12/2006 Weaver et al. ............ 455/414.2

(Continued)

FOREIGN PATENT DOCUMENTS

KR 10-2005-0101112 A 10/2005

(Continued)

OTHER PUBLICATIONS

W. Kim "OMA-LOC-2004-0185-CR-Separate_Periodic_Location_Request", Jun. 13, 2004, XP002552113, Retrieved from the Internet: URL:http://member.openmobilealliance.org/ftp/Public_documents/LOC/2004/OMA-LOC-2004-0185-CR-Separate_Periodic_Location_Request.zip>, [retrieved on Oct. 22, 2009], pp. 1-5.

J. Wang, et al., "OMA-LOC-2004-136R032-CR_SUPL_AD_Message_Periodic Call Flows", Jun. 12, 2004, XP002552114, Retrieved from the Internet: URL:http://member.openmobilealliance.org/ftp/Public_documents/LOC/2004/OMA-LOC-2004-0136R03-SUPL_Periodic_Call_Flows.zip>, [retrieved on Oct. 22, 2009], pp. 1-7.

(Continued)

*Primary Examiner*—Meless N Zewdu
(74) *Attorney, Agent, or Firm*—Birch, Stewart, Kolasch & Birch, LLP (57) ABSTRACT

A network-initiated area event triggered positioning method for a roaming terminal in a session-based position information system is disclosed. Network-initiation of area-based positioning of a roaming terminal is discriminated according to a proxy mode and a non-proxy mode, and area-based positioning for the roaming terminal is performed in various manners according to whether an SLP for performing the positioning procedure with respect to the discriminated modes is a V-SLP or an H-SLP.

49 Claims, 4 Drawing Sheets

U.S. PATENT DOCUMENTS

| | | | |
|---|---|---|---|
| 7,254,388 | B2 | 8/2007 | Nam et al. |
| 7,593,722 | B2* | 9/2009 | Jagadeesan et al. ......... 455/418 |
| 2004/0157620 | A1 | 8/2004 | Nyu |
| 2004/0203885 | A1 | 10/2004 | Quaid |
| 2005/0043038 | A1 | 2/2005 | Maanoja et al. |
| 2005/0099972 | A1 | 5/2005 | Motegi et al. |
| 2005/0118999 | A1* | 6/2005 | Zhu ........................ 455/432.1 |
| 2005/0136942 | A1 | 6/2005 | Timiri et al. |
| 2005/0250516 | A1 | 11/2005 | Shim |
| 2006/0003775 | A1* | 1/2006 | Bull et al. ................. 455/456.1 |
| 2006/0014531 | A1 | 1/2006 | Nam et al. |
| 2006/0030333 | A1* | 2/2006 | Ward et al. ............... 455/456.1 |
| 2006/0063536 | A1 | 3/2006 | Kim et al. |
| 2006/0276167 | A1 | 12/2006 | Burroughs |
| 2007/0096981 | A1* | 5/2007 | Abraham ............... 342/357.15 |
| 2007/0281670 | A1* | 12/2007 | Shim ....................... 455/414.2 |

FOREIGN PATENT DOCUMENTS

| | | |
|---|---|---|
| KR | 10-2006-0024305 A | 3/2006 |
| KR | 2006-0025973 A | 3/2006 |
| WO | WO-03/045101 A1 | 5/2003 |

OTHER PUBLICATIONS

Open Mobile Alliance: "Secure User Plane Location Architecture—Draft Version 1.0—Jun. 28, 2005", Jun. 28, 2005, XP002552115, Retrieved from the Internet: URL:http://member.openmobilealliance.org/ftp/Public_documents/LOC/Permanent_documents/OMA-AD-Supl-V1_0-20050628-D.zip>, [retrieved on Oct. 22, 2009], pp. 1-80.

Qualcomm: "Addition of Periodic Location Procedures". 3GPP TSG SA WG2. Jun. 27, 2005, pp. 1-26, XP-002410621, section 4.4.2.1; p. 10.

Shim et al., "Notification Based on Current Location-Non Proxy Mode", Mar. 27, 2006, pp. 1-6, XP-002566834, pp. 2-6.

Wachter et al., "SUPL 2.0 Area event Triggered Services for SI Proxy", Feb. 2, 2006, XP-002566949.

Wachter et al., "SUPL 2.0 AD Area Event Triggered Services for NI Proxy", Feb. 2, 2006, pp. 1-12, XP-002566835, pp. 5-8.

XU et al., "About Optimization Area Event Handing Proxy Mode", Jun. 2, 2006, XP-002566950.

Kim et al., "OMA-LOC-2004-0144-CR-Deferred_Location_Request_for_Area_Event, " OMA-LOC WG, May 17, 2004, pp. 1-5, XP002566434, Retrieved on Feb. 2, 2010 from Internet: <URL:http://member.openmobilealliance.org.ftp/Public_documents.LOC.2004/>.

Kim et al., "OMA-LOC-2004-0148R01-CR-SUPL_AD_SET_Intiated_Deferred_Message_Flows, " OMA LOC WG, Jun. 15, 2004, pp. 1-3, XP002566435, Retrieved on Feb. 2, 2010 from Internet: <URL:http://member.openmobilealliance.org.ftp/Public_documents.LOC.2004/>.

Kim et al., "OMA-LOC-2005_0365-SET_Init_NonRoaming-NonProxy_Deferred_Service, " OMA-LOC WG, Aug. 12, 2005, pp. 1-4, XP002566435, Retrieved on Feb. 2, 2010 from Internet: Retrieved on Feb. 2, 2010 from the Internet: <URL:http://member.openmobilealliance.org.ftp/Public_documents.LOC.2005/>.

Kim et al., "OMA-LOC-Network Intiated Deferred Service-NonRoaming-NonProxy, " OMA-LOC WG, Aug. 12, 2005, pp. 1-5, XP002566437, Retrieved on Feb. 2, 2010 from Internet: <URL:http://member.openmobilealliance.org.ftp/Public_documents.LOC.2005/>.

Wuk et al., "OMA-LOC-2004-0162R02-CR-Combined_Deferred_Location_Request, " OMA-LOC WG, Jun. 13, 2004, pp. 1-5, XP002566433, Retrieved on Feb. 2, 2010 from Internet: <URL:http://member.openmobilealliance.org/ftp/Public_documents.LOC.2004/>.

* cited by examiner

NETWORK-INITIATED AREA EVENT TRIGGERED POSITIONING METHOD FOR ROAMING TERMINAL IN MOBILE COMMUNICATION SYSTEM

This Nonprovisional application claims priority under 35 U.S.C. §119 on U.S. Provisional Application No(s). 60/789,609; 60/795,184; 60/810,631 and 60/836,938 filed on Apr. 6, 2006; Apr. 27, 2006; Jun. 5, 2006 and Aug. 11, 2006; respectively and Korean Patent Application No. 10-2007-11578 filed on Feb. 5, 2007 in Republic of Korea. The entire contents of these applications are herein fully incorporated by reference.

BACKGROUND OF THE INVENTION

1. Field of the Invention

The present invention relates to a mobile communication system and, more particularly, to a network-initiated area event triggered positioning method for a roaming terminal in a session-based position information system.

2. Description of the Related Art

In a mobile communication system a function part for calculating a position of a terminal is included in a mobile communication network to provide a location service for transferring a location of a terminal to a certain entity periodically or is according to a user request. A network structure related to the location service varies depending on an internal network structure such as 3GPP or 3GPP2, etc.

Methods for calculating the position of the terminal in the mobile communication system include a cell-ID method in which an id of a cell to which the terminal belongs is transferred, a method in which time taken for radiowaves to arrive at each base station from the terminal is measured and then the position of the terminal is calculated by using triangulation, and a method using GPS.

In order to provide the location service to a user by using the position calculating methods, considerable signaling and position information should be transferred between the mobile terminal and a position server. Thus, recently, standardized positioning technologies for providing the location service, namely, the location services based on the position of the mobile terminal, are widely adopted. The positioning technologies can be provided through a user plane and a control plane, and the SUPL (Secure User Plane Location) that provides the location service through the user plane is a typical example of the technologies.

The SUPL, which is effective for transferring position information required for calculating the position of the mobile terminal, transfers position assistance information such as GPS assistance and uses a user plane data bearer in order to transport positioning technology-related protocols between the mobile terminal and the network.

In general, in the position information system, a location service-related SUPL network includes a SUPL agent, an SLP (SUPL Location Platform) and an SET (SUPL Enabled Terminal). The SUPL agent indicates a logical service access point that uses actually measured position information, and the SLP indicates an SUPL service access point of the network that accesses network resources to obtain position information.

The SET is a device that communicates with the SUPL network using the SUPL interface, which can be, for example, a UE (User Equipment) of a UMTS, an MS (Mobile Station) of GSM, an IS-95 MS, or a laptop computer or a PDA having the SET function. The SET can be also various other types of mobile terminals that are connected through a WLAN.

The SET supports procedures defined in the SUPL by interworking with the network through the user plane bearer. In this case, the network to which the user had initially registered may be called a home network, and the network of an area where the user moves into from the home network area may be called a visited network. An SLP of the home network may be called an H-SLP (Home-SLP) and an SLP of the visited network may be called a V-SLP (Visited-SLP). When the SUPL procedure starts in the network, an SLP to which an external client is first connected may be called an R-SLP (Requesting SLP). The R-SLP can be a logical entity which is the same as the H-SLP or not. The SET for current positioning can be defined as the target SET.

The SLP, a network element, includes an SPC (SUPL Positioning Center) that calculates an actual location and an SLC (SUPL Location Center) that performs other roles of the SLP that calculates the position information, namely, roaming and resource management, etc. Thus, the SET may calculate the position information through communication with the SPC via the SLC (proxy mode) or calculate the position information by being immediately connected with the SPC (non-proxy mode).

However, although the related art provides the immediate positioning method based on the SUPL, it fails to propose area-based, area-related or area event triggered positioning for the SUPL-based roaming terminal.

SUMMARY OF THE INVENTION

Therefore, in order to address the above matters the various features described herein have been conceived. One aspect of the exemplary embodiments is to provide a network-initiated area event triggered positioning method for a roaming terminal based on an SUPL capable of allowing a roaming terminal to be positioned effectively in various manners.

This specification provides a network-initiated area event triggered positioning method for a roaming terminal in a mobile communication system that may include: sending, by a first server, a session initiation message for initiating a trigger session to the roaming terminal; receiving a session start message from the roaming terminal; requesting area ids related to area-based (area-related or area event-triggered) positioning from a second server and obtaining area ids; sending a session response message including at least a trigger parameter to the roaming terminal; receiving a positioning initiation message from the roaming terminal and transferring it to the second server; receiving a calculated position value of the roaming terminal from the second server and transferring the received position value to the roaming terminal; and providing the calculated position value received from the roaming terminal to an agent.

The first server may send the area ids obtained from the second server to the roaming terminal through the session response message. The first sever can be an H-SLP and the second server can be a V-SLP.

This specification also provides a network-initiated area event triggered positioning method for a roaming terminal in a mobile communication system that may include: sending, by a first server, a session initiation message for initiating a trigger session to the roaming terminal; receiving a session start message from the roaming terminal; requesting area ids related to area-based (area-related or area event-triggered) positioning from a second server and obtaining area ids; sending a session response message including at least a trigger parameter to the roaming terminal; receiving a positioning initiation message from the roaming terminal; performing, by the first server, a positioning procedure with the roaming terminal and sending a calculated position value of the roaming terminal to the roaming terminal; and providing the calculated position value received from the roaming terminal to an agent.

The first server may send the area ids obtained from the second server to the roaming terminal through the session response message.

This specification also provides a network-initiated area event triggered positioning method for a roaming terminal in a mobile communication system that may include: receiving, by the roaming terminal, a session initiation message for initiating a trigger session from a first server; sending a session start message to the first server; receiving a session response message including at least a trigger parameter from the first server; sending a positioning initiation message to the first server; receiving a measured position value with respect to the roaming terminal from the first server; comparing the received measured position value and a position value included in the trigger parameter to check whether an area event trigger condition is met; and sending, by the roaming terminal, the measured position value to the first server when the area event trigger condition is met.

The roaming terminal may receive area ids related to area-based positioning from the first server through the session response message.

This specification also provides a network-initiated area event triggered positioning method for a roaming terminal in a mobile communication system that may include: sending, by a first server, a session initiation message for initiating a trigger session to the roaming terminal; receiving a session start message including parameters related to setting at least a security session from the roaming terminal; requesting, by the first server, area ids related to area-based (area-related or area event-triggered) positioning from a third server via a second server and obtaining area ids; sending a session response message including at least a trigger parameter and the address of the third server to the roaming terminal; receiving a calculated position value with respect to the roaming terminal from the roaming terminal and providing the position value to an agent.

The first server may send the obtained area ids to the roaming terminal through the session response message. The first sever can be an H-SLC, the second server can be a V-SLC, and the third server can be a V-SPC.

This specification also provides a network-initiated area event triggered positioning method for a roaming terminal in a mobile communication system that may include: sending, by a first server, a session initiation message for initiating a trigger session to the roaming terminal; receiving a session start message including parameters related to setting at least a security session from the roaming terminal; requesting, by the first server, area ids related to area-based (area-related or area event-triggered) positioning from a second server and obtaining area ids; sending, by the first server, a session response message including at least a trigger parameter and the address of the third server to the roaming terminal; and receiving a calculated position value with respect to the roaming terminal from the roaming terminal and providing the position value to an agent.

The first server may send the obtained area ids to the roaming terminal through the session response message. The first sever can be an H-SLC, the second server can be a V-SLC, and the third server can be an H-SPC.

This specification also provides a network-initiated area event triggered positioning method for a roaming terminal in a mobile communication system that may include: receiving, by the roaming terminal, a session initiation message for initiating a trigger session from a first server; sending a session start message including parameters related to at least a security session to the first server; receiving a session response message including at least a trigger parameter and the address of a second server from the first server; sending, by the roaming terminal, a positioning initiation message to the second server; performing, by the roaming terminal, a positioning procedure by setting a security session with the second server by using the security session-related parameters; receiving a measured position value with respect to the roaming terminal from the second server; comparing, by the roaming terminal, the received measured position value and a position value included in the trigger parameter to check whether an area event trigger condition is met; and providing, by the roaming terminal, the measured position value to the first server when the area event trigger condition is met.

The roaming terminal may receive area ids related to area-based positioning from the first server through the session response message.

The first server may obtain the area ids from the second server via a third server and provide them to the roaming terminal. In this case, the first server is an H-SLC, the second server is a V-SPC, and the third server is a V-SLC.

In addition, the first server may obtain the area ids from the third server and provide them to the roaming terminal. In this case, the first server is the H-SLC, the second server is an H-SPC, and the third server is the V-SLC.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Exemplary embodiments of the present invention will now be described in detail.

The present invention is implemented in an SUPL network, and without being limited thereto, the present invention can be also applicable to any wireless communication system that may be operated according to a different specification.

In the present invention, in a session-based position information system, when a server and a terminal manage positioning-related trigger information, an area event triggered positioning procedure with respect to a terminal which has roamed to a visited network (in case where the terminal moves into a particular position, continuously exists in a particular area, or moves out of the particular area) is provided.

In the area event triggered positioning, a home network requests area id(s) set for the area-based positioning from the visited network, obtains area id(s), and provides the obtained area id(s) to the roaming terminal (namely, a target SET).

In the area-based (area-related or area event-triggered) positioning, the roaming terminal is not continuously positioned but it is first checked whether the roaming terminal has approached a particular area (requested area or an event area), and when the roaming terminal has approached the particular area, the roaming terminal positioning procedure starts. The roaming terminal determines whether to start or not the positioning procedure according to whether a positioning start condition is met or not. The positioning start condition being met means that the roaming terminal is near (or has approached) an area (e.g., a particular area, a requested area, or an event area) that is specified in the area event trigger condition information.

When the calculated actual position of the roaming terminal is in an area specified in the area event trigger condition information (namely, when the area event trigger condition is met), the roaming terminal determines that the area event has occurred and sends the calculated position value to a client (terminal or an agent included in a network).

Here, the occurrence of the area event refers to the confirmation as to whether the terminal has moved into the particular area, moves out of the area, or exists in the area.

In general, the positioning service provided in the SUPL-based position information system is classified into a network-initiated case and a SET-initiated case.

In addition, the SUPL-based positioning service is discriminated in a proxy mode in which the H-SLP of the home network is operated as a proxy so the positioning procedure is performed between the position server and a roaming SET necessarily through the H-SLP, and a non-proxy mode in which the H-SLP is operated in a non-proxy mode so the positioning procedure is performed directly between the position server and the roaming SET without going through the H-SLP. Here, the position server can be the H-SLP or the V-SLP.

Types of services can be divided (classified) according to whether the H-SLP (or H-SPC) or the V-SLP (or the V-SPC) performs the positioning function for calculating the position of the roaming SET, when the network initiates a service.

In the present disclosure, for the case where the network initiates a service, four exemplary embodiments will be described according to whether or not the proxy mode is used and the position server being an SLP of which particular network.

First, network-initiated area event triggered positioning method for the roaming terminal according to a first exemplary embodiment of the present invention will now be described.

Figure 1:
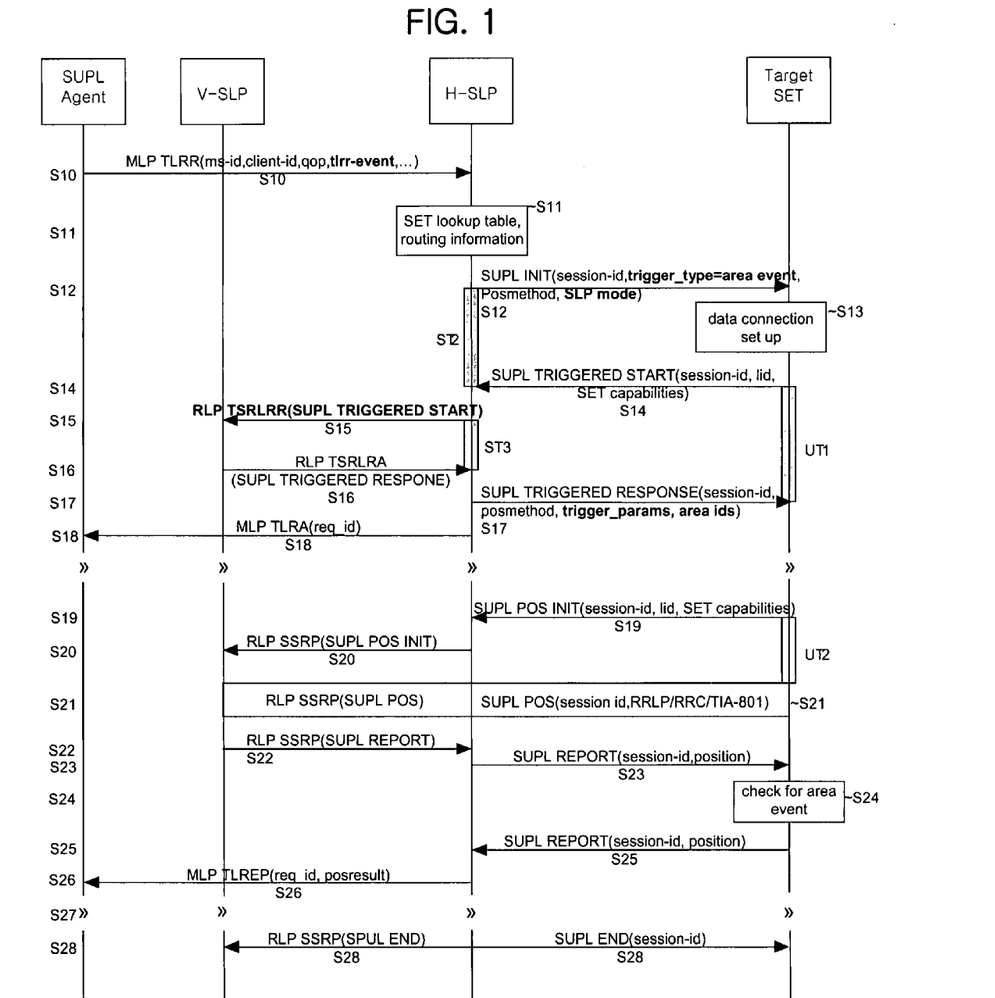
FIG. 1 is a network-initiated area event triggered positioning method according to a first exemplary embodiment of the present invention.

FIG. 1 is a network-initiated area event triggered positioning method according to the first exemplary embodiment of the present invention, showing a roaming case, a network-initiated case, a V-SLP positioning case and the proxy mode. Namely, the SET (namely, target SET) is the roaming SET which has roamed to the visited network to which the V-SLP belongs, the V-SLP performs the positioning function (namely, the V-SLP is operated as the position server), and the H-SLP uses the proxy mode.

As shown in FIG. 1, when an area-based positioning is requested from an external LCS (Location Services) client, the SUPL agent sends an MLP (Mobile Location Protocol) TLRR (Triggered Location Reporting Request) message to the H-SLP in order to request an area-based positioning service (area event trigger service) (step S10).

The MLP TLRR message includes parameters such as ms-id, client-id, QoP and tlrr_event, etc. The ms-id indicates a target SET, and the client-id indicates an id of the SUPL agent. The QoP indicates precision degree of positioning (temporal delay and spatial precision). The tlrr_event is a positioning related trigger parameter and can be various information regarding positioning related condition information such as a change_area type of area-based positioning (whether the roaming terminal moves into a particular area, moves out of the particular area, or is located in the particular area, etc.), the particular area (the name of the particular area or precise position value), and the like.

When there are several types of positioning values or when there are several requests for positions, the MLP TLRR message may include a parameter, or the like, for setting priority with respect to each request for positions.

Upon receiving the MLP TLRR, the H-SLP authenticates the SUPL agent and checks if the SUPL agent is authorized for the service it requests, based on the client-id.

In addition, the H-SLP may apply a subscriber privacy function to the SUPL agent based on the received ms-id.

The H-SLP verifies that the target SET (referred to as 'SET' hereinafter) supports SUPL by using a SET look-up table, and also verifies that the SET is currently SUPL roaming (step S11).

When the SET supports the SUPL and is currently roaming, the SLP sends an SUPL INIT message to the SET to start an area event triggered session with the SET (step S12). The SUPL INIT message can be transmitted through a WAP (Wireless Application Protocol) Push, an SMS (Short Message Service) trigger, an SIP (Session Initiation Protocol) Push, an UDP/IP, etc.

The SUPL INIT message may contain a session-ID, a trigger type indicator (e.g., area event), an SLP mode (proxy/non-proxy mode indicator), and an intended positioning method parameter.

Before performing the step S11, the H-SLP may verify (check) privacy of the SET, and in this case, if notification or verification to the target subscriber (user) is needed, the H-SLP may also include a notification parameter (notification element) in the SUPL INIT message.

As the H-SLP sends the SUPL INIT message including the trigger type indicator, the SET can be aware that the area-based positioning has been currently requested through the trigger type parameter included in the received SUPL INIT message.

Upon receiving the SUPL INIT message, if the SET is not already attached or establish a circuit switched data connection with a network, the SET establishes a data connection with a packet data network (3GPP or 3GPP2) (step S13).

In addition, in order to determine if the H-SLP uses the proxy mode or the non-proxy mode, the SET checks an SLP mode parameter contained in the SUPL INIT message. When the SLP mode parameter indicates the proxy mode, the SET determines that the H-SLP uses the proxy mode and establishes a secure IP (Internet Protocol) connection to the H-SLP. In this case, the IP connection is established to the SET using the address of the H-SLP that has been provisioned by the home network.

When the data connection is established, the SET sends a SUPL TRIGGERED START message to the H-SLP operating as the proxy in order to start an area event triggered session (step S14). The SUPL TRIGGERED START message contains at least session-ID, lid (location identifier) and SET capability information. The lid is an identifier of a current position of the SET and indicates an id of a cell in which the SET is currently located.

When the SUPL TRIGGERED START message is received, the H-SLP determines the V-SLP based on the lid included in the SUPL TRIGGERED START message. And then, the H-SLP sends an RLP (Roaming Location Protocol) TSRLRR (Triggered Standard Roaming Location Reporting Request) message including the SUPL TRIGGERRED START message to the V-SLP to inform the V-SLP that the target SET will initiate a SUPL positioning procedure (step S15).

The H-SLP should include area-ids request indicator parameter and a tlrr_event parameter which was contained in the MLP TLRR message in the step S10 (namely, parameters related to the area event trigger such as the area information requested by the SUPL agent), in the SUPL TRIGGERD START message.

By sending the RLP TSRLRR message, the H-SLP requests area ids used for the area event triggered session from the V-SLP.

Upon receiving the RLP TSRLRR message, the V-SLP determines a positioning method (posmethod) to be used for the area event triggered session from the SET capabilities included in the RLP TSRLRR message. And, the V-SLP sends an RLP TSRLRA (Triggered Standard Roaming Location Reporting Answer) message including SUPL TRIGGER RESPONSE message information to the H-SLP in order to inform the H-SLP about its readiness for an area event triggered session.

The V-SLP also checks the area ids request indicator included in the RLP TSRLRR message. If area ids are requested by the H-SLP, the V-SLP should include area ids corresponding to the areas for the area event triggered session in the SUPL TRIGGER RESPONSE message and then send an RLP TSRLRA message including the SUPL TRIGGER RESPONSE message information (step S16).

The H-SLP forwards the received SUPL TRIGGER RESOPNSE message including session-ID, the positioning method (posmethod) and the trigger parameters (trigger-Params) to the SET.

The trigger parameters indicate trigger condition information related to the area event trigger for positioning.

For example, the trigger parameter may contain trigger condition information indicating the change_area type of the area event and a particular area (or an event area). The change_area type of the area event (it can be referred to the change_area type related to area-based positioning or the change_area type related to area event triggered positioning) may indicate whether the roaming terminal is moved into the particular area, moved out of the particular area, or is located in the particular area. The particular area may include at least one of the name of an administrative district, the name of an area, and latitude and longitude of a particular position.

The H-SLP may selectively include the area ids or location identifiers. (lids) of the specified area for the area event triggered session in the SUPL TRIGGER RESPONSE message (step S17).

Preferably, the area ids can be information indicating a location area in the actual network such as ids of cells belonging to the area required for positioning by the SUPL agent, a mobile country code (MCC), a mobile network code (MNC) or a location area code (LAC), etc., or a primary scrambling code number. In particular, in case of the WCDMA, the area ids may correspond to the primary scrambling code number.

And then, H-SLP informs the SUPL agent in an MLP TLRA (Triggered Location Reporting Answer) message that the triggered location response request has been accepted (step S18).

The H-SLP includes a request id parameter (req_id) of the MLP TLRA message to be used as a transaction id for the entire duration of the area event triggered session.

Thereafter, the SET may release the secure IP connection with the H-SLP.

When the area id (or area ids) is/are received in the SUPL TRIGGER RESPONSE MESSAE, the SET checks whether the positioning session start condition is met.

For example, whether the positioning session start condition is met or not can be checked by comparing the current area id of the SET and area ids received from the H-SLP.

Namely, the SET compares the current area id (namely, the ID of the cell in which the SET is currently located) and the received area ids (namely, the received cell ids) to check whether there is the same area id.

When the change_area type of the area event included in the trigger parameters (trigger_params) indicates that SET moves into the particular area or in the particular area and at least one of the received area ids is identical to the current area id of the SET, the SET starts the positioning session. That is, when at least one of the received area ids is identical to the current area id of the SET, the SET determines that the positioning session start condition is met.

When the change_area type of the area event indicates that the SET moves out of the particular area and the received area ids and the current area id of the SET are not identical, the SET determines that the positioning session start condition is met.

The comparison of the current area id to the received area ids or the area event trigger in the SET indicates that a position fix has to be performed. Namely, the SET verifies its substantial position and checks whether it has approached to the area requested by the SUPL agent. Accordingly, the position of the SET is not always calculated (tracked0 but when the SET is determined to have approached to the requested area, the SET informs that the positioning session should start and the position server (in this case, the V-SLP) starts to calculate the position of the SET.

When it is verified that the positioning session start condition is met by comparing the area ids, the SET recognizes that it has currently approached to the requested are and sends an SUPL POS INIT message to the H-SLP to initiate the positioning session (that may be called a position calculation session) (step S19). The SUPL POS INIT message contains at least session-ID and the current area id of the SET. Here, if the SET is not already attached or establishes a circuit switched data connection, it attaches itself to the packet data network and sends the SUPL POS INIT message to the H-SLP to start the positioning session with the V-SLP.

The H-SLP serving as the proxy forwards the received SUPL POST INIT message to the V-SLP performing the positioning function using an RLP SSRP message (step S20).

Upon receiving the RLP SSRP message, if a position value (e.g., the cell id) calculated based on information received in the RLP SSRP message is available that meets the required QoP, the V-SLP may directly proceed to step S22, omitting the step S21. If the calculated position value (cell id) does not meet the required QoP, the V-SLP proceeds to the step S21. Thus, it can be noted that the cell id-based positioning method is not used in the step S21.

The SET and the V-SLP may exchange several successive message for performing actual positioning through the H-SLP to calculate the position of the SET (step S21). Preferably, the messages exchanged between the V-SLP and the SET contain the session-ID and protocols (RRLP, RRC or TIA-801), etc., to be used for the positioning. The V-SLP calculates the position estimate based on the positioning measurements received from the SET (SET-assisted mode), or the SET calculates the position estimate based on assistance obtained from the V-SLP (SET-based mode). In the first exemplary embodiment as shown in FIG. 1, the calculation of the position is performed in the SET-assisted mode, the V-SLP sends the calculated position result (posresult) in an SUPL REPORT message to the SET via the H-SLP (steps S22 and S23). When the calculation of the position is performed in the SET-based mode, the SUPL REPORT message is not necessary.

When the position result of the SET is received from the V-SLP via the H-SLP, the SET compares the calculated position estimate and a position value of the particular area (event area) specified in the trigger parameter to check if the area event trigger condition has been met, namely, whether the area event has occurred.

Upon comparison, when the position result of the SET is not identical to the position value specified in the trigger parameter, the SET determines that the area event trigger condition has not been met (namely, the area event has not occurred) (step S24) and proceeds back to the step S19 to send the SUPL POS INIT message again to the V-SLP via the H-SLP (steps S19 and S20).

If, however, the position estimate of the SET is identical to the position value specified in the trigger parameter (namely, when the area event has occurred) (step S24), the SET sends the SUPL REPORT message to the H-SLP (step S25). The SUPL REPORT contains the calculated position estimate received from the V-SLP and the session ID.

The H-SLP sends the calculated position estimate of the SET and the requested id (req-id) in an MLP TLREP message to the SUPL agent (step S26).

When a response to the positioning report requested by the SUPL agent is sent, the SET waits for a certain time.

And then, the SET repeats the steps S19 to S26 or the steps S19 to S24 depending on if the area event condition is fulfilled or not (step S27).

When the last report of the reports required by the SUPL agent has been sent, the H-SLP sends an SUPL END message to the SET to inform the SET that the positioning session has been ended. Then, the SET and the V-SLP release all the resources related to the positioning session, respectively (step S28).

In the first exemplary embodiment of the present invention as illustrated in FIG. 1, when the network initiates the positioning service, the V-SLP having the positioning function wants to check (calculate) the area-based position of the roaming SET, the roaming SET and the V-SLP establish the area event triggered session via the H-SLP operating as the proxy and calculate the area-based position of the roaming SET.

An area-based positioning method according to the second exemplary embodiment of the present invention will now be described.

Figure 2:
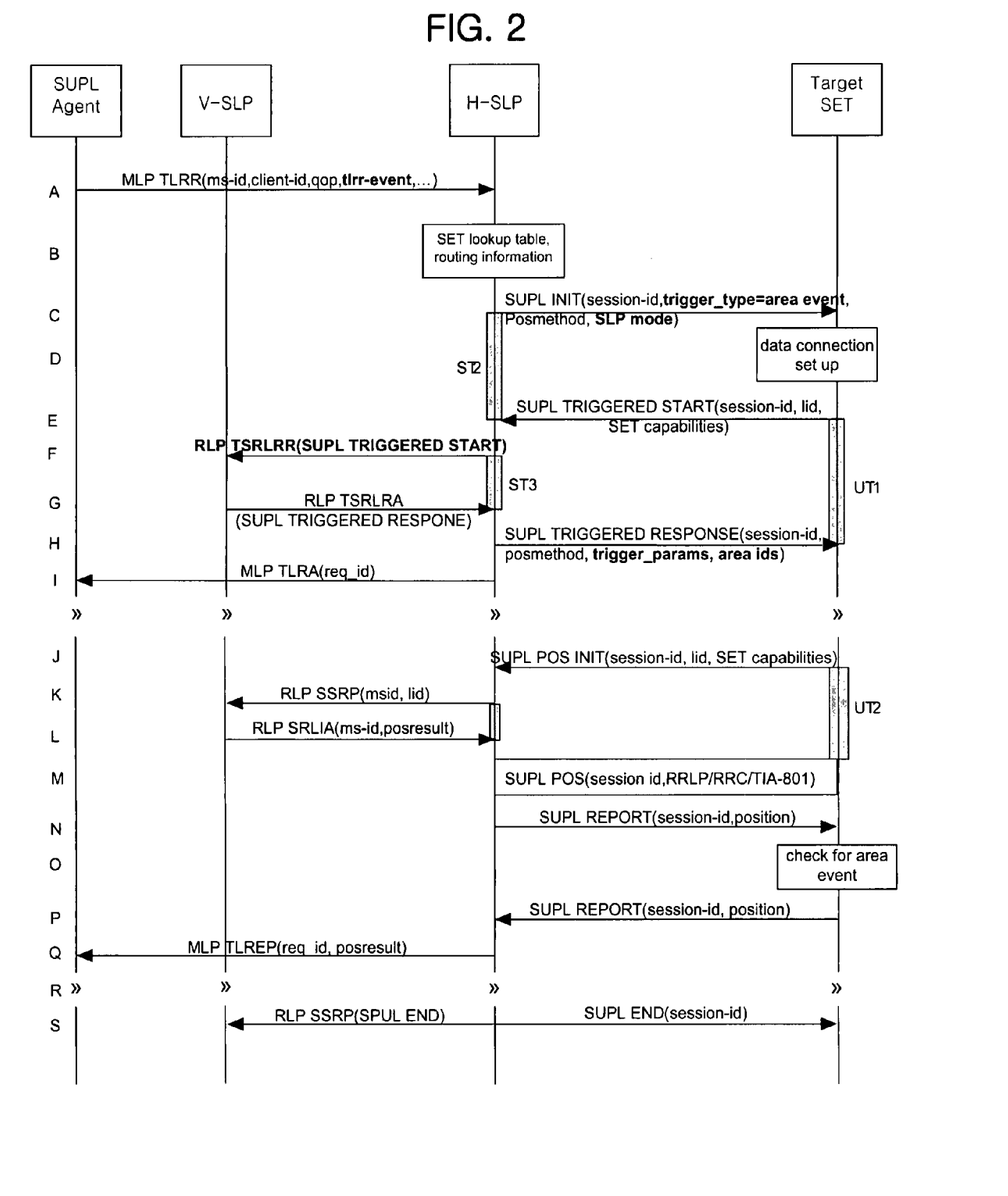
FIG. 2 is a network-initiated area event triggered positioning method according to a second exemplary embodiment of the present invention.

FIG. 2 is a network-initiated area event triggered positioning method according to a second exemplary embodiment of the present invention.

In the area-based positioning method according to the second exemplary embodiment of the present invention, a roaming case, a network-initiated case, an H-SLP positioning case and a proxy mode are implemented. Compared with the first exemplary embodiment of the present invention, the H-SLP has the positioning function in the second exemplary embodiment of the present invention.

In the second exemplary embodiment of the present invention, an area event triggered session is established in the same manner as that (steps S10 to S18) of the first exemplary embodiment of the present invention shown in FIG. 1 (A-I).

When a positioning session start condition is met, the SET (roaming SET) sends an SUPL POS INIT message containing at least current area id (lid) and a SET id (ms id) to the H-SLP serving as a proxy in order to start the procedure for calculating the position of the SET itself (J).

The H-SLP serving as the proxy (namely, which uses the proxy mode) sends the received current area id (lid) and the SET id (ms id) in an RLP SRLIR message to the V-SLP (K).

The V-SLP translates the current area id (lid) to a position estimate and returns the position estimate to the H-SLP (L).

The H-SLP checks if the returned position estimate satisfies the QoP, and when the returned position estimate satisfies the QoP, the H-SLP sends the returned position estimate in an SUPL REPORT message to the SET without performing the positioning (SUPL POS) procedure (M, N).

If, however, the returned position estimate does not satisfy the QoP, the H-SLP performs the positioning (SUPL POS) procedure to calculate a position estimate of the SET and send the calculated position estimate in the SUPL REPORT message to the SET (M, N).

Thereafter, the H-SLP checks whether an area event has occurred, and provides a precise area-based position value of the SET to the SUPL agent according to whether the area event has occurred or not, likewise as in the first exemplary embodiment of the present invention.

In the second exemplary embodiment of the present invention, when the network initiates the area-based positioning service of the roaming SET which has roamed to the V-SLP, the area event triggered session is established between the V-SLP and the roaming SET via the H-SLP serving as the proxy, and when the SUPL POS INIT message if sent from the roaming SET as the positioning session start condition is met, the H-SLP calculates an actual position of the roaming SET.

A network-initiated area event triggered positioning method according to a third exemplary embodiment of the present invention will be described.

Figure 3:
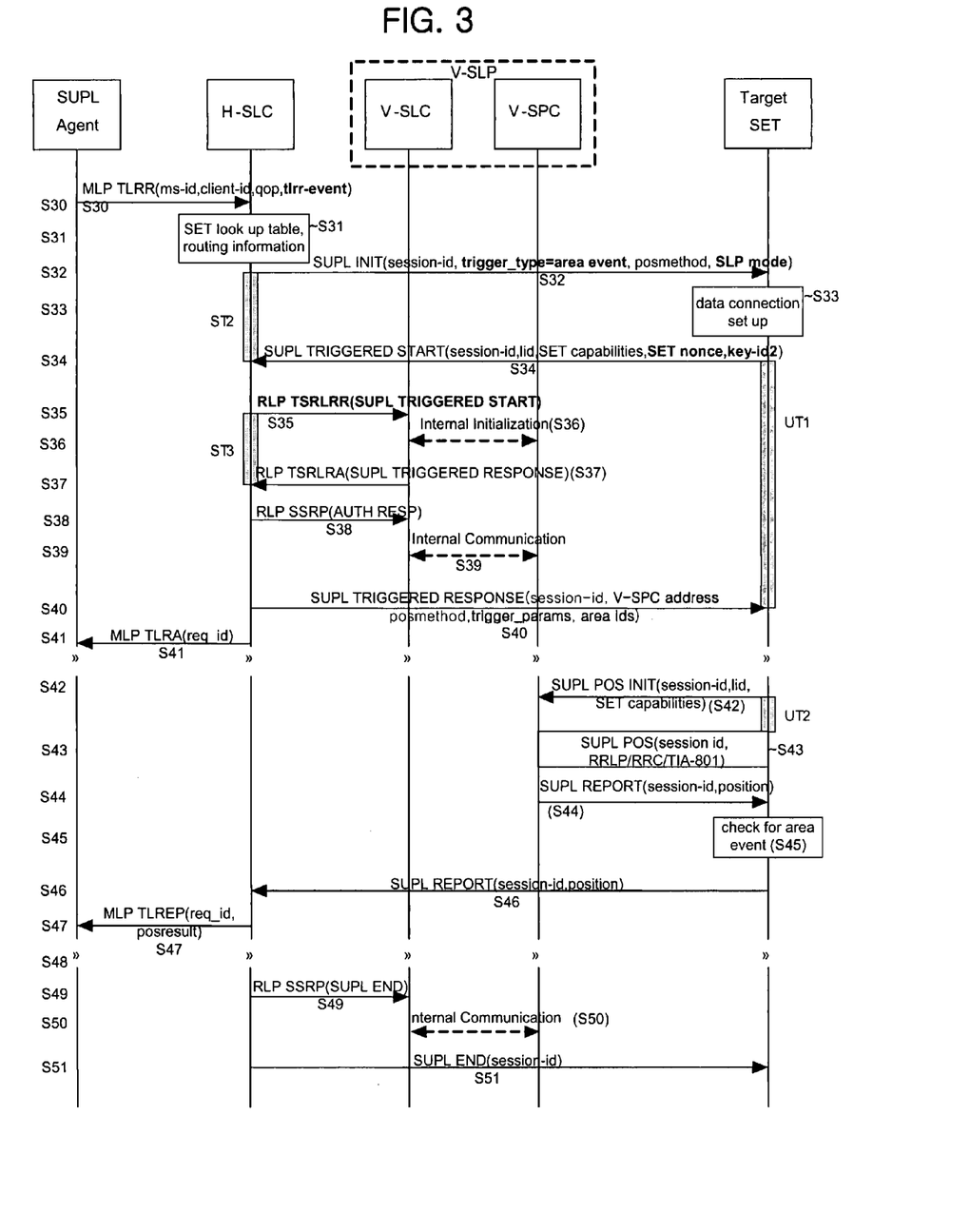
FIG. 3 is a network-initiated area event triggered positioning method according to a third exemplary embodiment of the present invention.

FIG. 3 is a network-initiated area event triggered positioning method according to a third exemplary embodiment of the present invention.

In the third exemplary embodiment of the present invention, a roaming case, a network-initiated case, a V-SLP positioning case and a case where the H-SLP uses the non-proxy mode are implemented. The SET (target SET) is a roaming SET which has roamed to the V-SLP and the V-SLP performs the positioning function.

The V-SLP includes the V-SPC and the V-SLC, and specifically, the V-SPC performs the positioning function. The H-SLP includes the H-SLC and the H-SPC. Only the H-SLC is shown in FIG. 3, and the H-SLC uses the non-proxy mode.

Steps S30 to S33 perform the same process as the steps S10 to S13 in FIG. 1.

In step S32, upon checking an SLP mode value contained in the SUPL INIT message transmitted from the H-SLC, the roaming SET recognizes that the H-SLC uses the non-proxy mode.

In order to start the area-based event triggered session, the SET sends an SUPL TRIGGERED START message containing at least a session ID, location id (lid) and SET capabilities to the H-SLC. The SET also includes SET nonce and key-id 2 in the SUPL TRIGGERED START message and sends it for authentication required in the non-proxy mode. The key-id 2 corresponds to a key for generating a security key to be used for setting a security session (PSK-TLS session0 between the V-SPC and the SET (step S34).

The H-SLC determines the V-SLC and sends an RLP TSR-LRR message including the SUPL TRIGGERED START message to the V-SLC to inform the V-SLC that the SET has initiated the SUPL positioning procedure.

In this case, the H-SLC should include an area ids request indicator parameter and the tlrr_event which has been included in the MLP TLRR message in the step S30 (namely, parameters related to the area event trigger such as the area information requested by the SUPL agent) in the RLP TSR-LRR message (step S35).

Thus, by sending the RLP TSRLRR message, the H-SLC requests the area ids used for the area event triggered session from the V-SLC.

The V-SLC informs the V-SPC about the area event triggered session through internal communication. The V-SLC generates a key to be used for mutual authentication between the V-SPC and the SET by using the key-id 2 and the SET nonce, and sends the generated key to the V-SPC through internal communication. The V-SPC accepts or refuses the request related to the area event triggered session and informs the V-SLC about a corresponding result (step S36).

The V-SLC checks the area ids request indicator transmitted from the H-SLC, and if area ids have been requested by the H-SLC, the V-SLC should include area ids corresponding to the area for the area event triggered session in a SUPL TRIGGERED RESPONSE message.

The V-SLC determines a positioning method (posmethod) to be used for the area event triggered session according to the SET capabilities received in the step S35 and sends an RLP TSRLRA message including the SUPL TRIGGERED RESPONSE message to the H-SLC to inform the H-SLC about its readiness for an area event triggered session (step S37).

The H-SLC generates a key (security key: PSK_SPC_Key) to be used for mutual authentication between the V-SPC and the SET and sends the generated key (security key) to the V-SLC via an AUTH RESP message by using an RLP SSRP tunnel (step S38).

The V-SLC sends the received key (security key) to the V-SPC through internal communication (step S39).

The H-SLC sends the SUPL TRIGGERED RESPONSE message received from the V-SLC to the SET. The SUPL TRIGGERED RESOPNSE message contains session-ID, posmethod, V-SPC address and a trigger parameter (trigger_params). The V-SPC address indicates the address of the V-SPC that performs the positioning function. The trigger parameter indicates trigger condition information related to the area event trigger for positioning.

For example, the trigger parameter may contain trigger condition information indicating the change_area type of the area event and a particular area. The change_area type of the area event may indicate whether the roaming terminal is moved into the particular area, moved out of the particular area, or is located in the particular. The particular area may include at least one of the name of an administrative district, the name of an area, and latitude and longitude of a particular position.

The area ids or location identifiers (lids) of the specified area for the area event triggered session may be included in the SUPL TRIGGER RESPONSE message.

Preferably, the area ids can be information indicating a location area in the actual network such as ids of cells belonging to the area required for positioning by the SUPL agent, a mobile country code (MCC), a mobile network code (MNC) or a location area code (LAC), etc., or a primary scrambling code number. In particular, in case of the WCDMA, the area ids may correspond to the primary scrambling code number.

Thereafter, steps S41 to S51 are performed in the almost similar manner as the steps S18 to S28 illustrated in FIG. 1 and only the differences therebetween will now be described.

In the first exemplary embodiment as shown in FIG. 1, when the positioning session start condition is met, the SET sends the SUPL POS INIT message to the V-SLP via the H-SLP (steps S19 and S20). Comparatively, in the third exemplary embodiment of the present invention as shown in FIG. 3, when the positioning session start condition is met, the SET directly sends the SUPL POS INIT message to the V-SPC corresponding to the address of the V-SPC included in the SUPL TRIGGERED RESPONSE message received in step S40.

Accordingly, in step S43, the V-SPC directly opens the positioning session with the SET without going through the H-SLC.

Meanwhile, in step S21 in FIG. 1, the V-SLP opens the positioning session with the SET via the proxy H-SLP and sends and receives successive messages for calculating the position via the H-SLP to calculate the actual position of the SET.

Comparatively, in step S43, the calculated position value of the SET is sent from the V-SPC to the SET, and the SET checks if an area event has occurred based on the calculated position value of the SET. Namely, the SET compares the calculated position value and the position value of the event area specified in the trigger parameter to check whether they are the same.

The SET may report the calculated position value to the H-SLC by sending the SUPL REPORT message, or may send again the SUPL POS INIT message to the V-SPC, according to whether the area event occurs or not.

As mentioned above, in the third exemplary embodiment of the present invention as shown in FIG. 3, when the network initiates the positioning service and the V-SPC having the positioning function wants to check (calculate) area-based position of the roaming SET, the H-SLC obtains the area ids specified for the area event triggered session from the V-SLC and provides them to the roaming SET, and the roaming SET and the V-SPC directly set a positioning session therebetween without going through the H-SLP serving as the non-proxy and calculates the area-based position of the roaming SET.

A network-initiated area event triggered positioning method according to a fourth exemplary embodiment of the present invention will be described.

Figure 4:
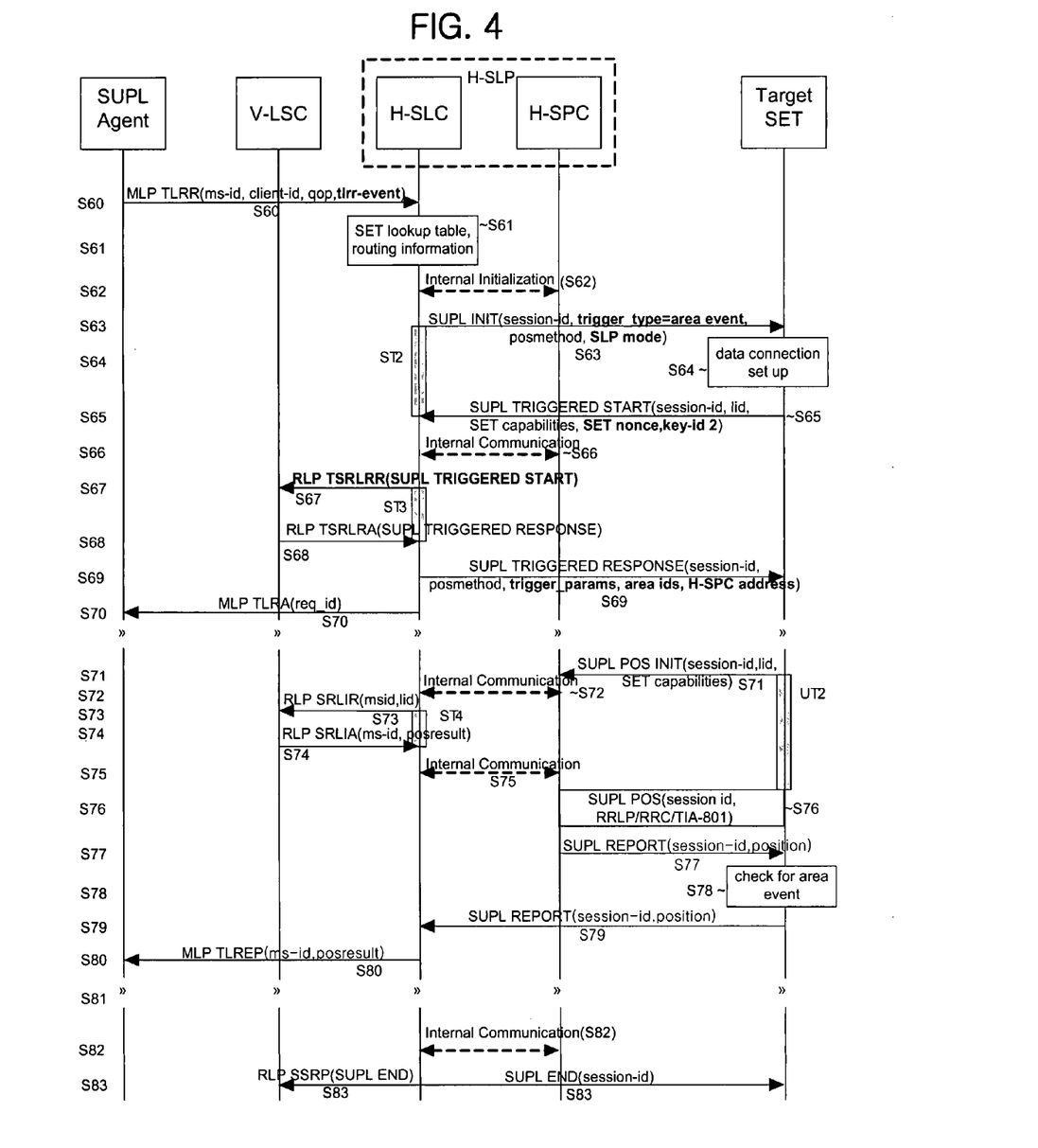
FIG. 4 is a network-initiated area event triggered positioning method according to a fourth exemplary embodiment of the present invention.

FIG. 4 is a network-initiated area event triggered positioning method according to a fourth exemplary embodiment of the present invention. In the fourth exemplary embodiment of the present invention, a roaming case, a network-initiated case, an H-SLP positioning case and a case where the H-SLP uses the non-proxy mode are implemented. The SET (target SET) is a roaming SET which has roamed to a visited network to which the V-SLP belongs, and the H-SLP performs the positioning function.

The V-SLP includes the V-SPC and the V-SLC, and only the V-SLC is shown in FIG. 4.

The H-SLP includes the H-SLC and the H-SPC, and the H-SPC performs the positioning function and the H-SLC uses the non-proxy mode.

Compared with the third exemplary embodiment of the present invention as shown in FIG. 3, in the fourth exemplary embodiment of the present invention, the H-SPC performs the positioning function.

Accordingly, when a positioning service request related to an area event triggered session is received, the H-SLC of the H-SLP sends the service request to the H-SPC. The H-SPC accepts or rejects the request and provides a corresponding result to the H-SLC.

The SET nonce and key id 2 parameters transmitted from the SET to the H-SLC in step S34 in FIG. 3 are used to establish the security session between the V-SPC that performs the positioning function and the SET, while the SET nonce and key-id 2 parameters transmitted from the SET to the H-SLC in step S65 in FIG. 4 are used to establish a security session between the H-SPC and the SET.

In step S65, when the SUPL TRIGGERED START message is sent from the SET, the H-SLC sends an RLP TSRLRR message to the V-SLC to request area ids corresponding to areas for an area event triggered session (step S67).

Then, the V-SLC sends SUPL TRIGGERED RESOPNSE message information including the area ids through an RLP TSRLRA message to the H-SLC (step S68).

The H-SLC sends the SUPL TRIGGERED RESPONSE message received form the V-SLC to the SET. The SUPL TRIGGERED RESPONSE message contains a session-ID, a posmethod, an H-SPC address and a trigger parameter (trigger_params). The H-SPC address indicates the address of the H-SPC that performs the positioning function, and the trigger parameter indicates trigger condition information related to the area event trigger for positioning.

For example, the trigger parameter may contain trigger condition information indicating the change_area type of the area event and a particular area. The change_area type of the area event may indicate whether the roaming terminal is moved into the particular area, moved out of the particular area, or is located in the particular. The particular area may include at least one of the name of an administrative district, the name of an area, and latitude and longitude of a particular position.

The area ids or location identifiers (lids) of the specified area for the area event triggered session may be included in the SUPL TRIGGER RESPONSE message.

Preferably, the area ids can be information indicating a location area in the actual network such as ids of cells belonging to the area required for positioning by the SUPL agent, a mobile country code (MCC), a mobile network code (MNC) or a location area code (LAC), etc., or a primary scrambling code number. In particular, in case of the WCDMA, the area ids may correspond to the primary scrambling code number.

Thereafter, steps S70 to S83 are performed in the almost similar manner as the steps S41 to S51 illustrated in FIG. 3 and only the differences therebetween will now be described.

In the third exemplary embodiment as shown in FIG. 3, when the positioning session start condition is met, the SET directly sends the SUPL POS INIT message to the V-SPC (step S42). Comparatively, in the fourth exemplary embodiment of the present invention as shown in FIG. 4, when the positioning session start condition is met, the SET sends the SUPL POS INIT message to the H-SPC corresponding to the address of the H-SPC included in the SUPL TRIGGERED RESPONSE message received in step S69.

The V-SPC in FIG. 3 converts the current area id (lid) included in the received SUPL POS INIT message to a position estimate value. Comparatively, the H-SPC in FIG. 4 is not able to directly convert the current area id (lid) included in the received SUPL POS INIT message to a position estimate value, so the H-SPC obtains the position estimate value corresponding to the lid upon requesting it from the V-SLC in steps S72 to S75.

In FIG. 4, the H-SPC selectively performs the procedure for calculating the actual position of the SET (namely, the positioning procedure) according to whether the converted position estimate value satisfies the QoP or not (steps S76 and S77). The SET checks whether an area event has occurred based on the calculated position value of the SET (step S78) and sends a corresponding message to the H-SLC (step S79).

As stated above, in the fourth exemplary embodiment of the present invention as shown in FIG. 4, when the network initiates the positioning service and the H-SPC having the positioning function wants to check (calculate) area-based position of the roaming SET, the H-SLC obtains the area ids specified for the area event triggered session from the V-SLC and provides them to the roaming SET, and the roaming SET and the V-SPC directly set a positioning session therebetween without going through the H-SLP serving as the non-proxy and calculates the area-based position of the roaming SET.

As so far described, the network-initiated area event triggered positioning method for a roaming terminal in a SUPL-based location information system according to the present invention allows diverse positioning methods to be implemented based on the SUPL.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A network-initiated area event triggered positioning method for a roaming terminal in a mobile communication system, comprising:

sending by a first server, a session initiation message for initiating a trigger session to the roaming terminal;

receiving, by the first server, a session start message from the roaming terminal;

requesting, by the first server, area identities (ids) related to area event-triggered positioning from a second server and obtaining, by the first server, area ids;

sending, by the first server, a session response message including at least a trigger parameter to the roaming terminal;

receiving, by the first server, a positioning initiation message from the roaming terminal and transferring it to the second server;

receiving, by the first server, a calculated position value of the roaming terminal from the second server and transferring, by the first server, the received calculated position value to the roaming terminal; and providing, by the first server, the calculated position value received from the roaming terminal, to an agent, wherein the calculated position value is received from the roaming terminal when the trigger parameter is satisfied by the roaming terminal.

2. The method of claim 1, wherein the first server sends the area ids obtained from the second server to the roaming terminal through the session response message.

3. The method of claim 1, wherein the session initiation message comprises at least trigger type information.

4. The method of claim 3, wherein the trigger type information indicates an area event trigger type.

5. The method of claim 1, wherein the trigger parameter comprises at least a change_area type related to area event-triggered positioning or position values of an event area related to area event-triggered positioning.

6. The method of claim 1, wherein the area ids correspond to one of ids of cells belonging to an event area related to the area event-triggered positioning, a mobile country code (MCC), a mobile network code (MNC) or a location area code (LAC), or a primary scrambling code number.

7. The method of claim 1, wherein the first server uses a proxy mode and the second server has a positioning function.

8. The method of claim 1, further comprising:
receiving, by the first server, a message for requesting the area event-triggered positioning service from the agent.

9. The method of claim 1, wherein the first server is an H-SLP (Home-SLP (SUPL (Location Platform)) and the second server is V-SLP (Visited-SLP).

10. A network-initiated area event triggered positioning method for a roaming terminal in a mobile communication system, comprising:
sending, by a first server, a session initiation message for initiating a trigger session to the roaming terminal;
receiving, by the first server, a session start message from the roaming terminal;
requesting, by the first server, area identities (ids) related to area event-triggered positioning from a second server and obtaining, by the first server, area ids from the second server;
sending, by the first server, a session response message including at least a trigger parameter to the roaming terminal;
receiving, by the first server a positioning initiation message from the roaming terminal;
performing, by the first server, a positioning procedure with the roaming terminal and sending, by the first server, a calculated position value of the roaming terminal to the roaming terminal; and
providing, by the first server, the calculated position value received from the roaming terminal, to an agent, wherein the calculated position value is received from the roaming terminal when the trigger parameter is satisfied by the roaming terminal.

11. The method of claim 10, wherein the first server sends the area ids obtained from the second server to the roaming terminal through the session response message.

12. The method of claim 10, wherein the session initiation message comprises at least trigger type information.

13. The method of claim 12, wherein the trigger type information indicate an area event trigger type.

14. The method of claim 10, wherein the trigger parameter comprises at least a change_area type related to area event-triggered positioning or position values of an event area related to area event-triggered positioning.

15. The method of claim 10, wherein the area ids correspond to one of identities (ids) of cells belonging to an event area related to the area event-triggered positioning, a mobile country code (MCC), a mobile network code (MNC) or a location area code (LAC), or a primary scrambling code number.

16. The method of claim 10, wherein the first server uses a proxy mode and has a positioning function for calculating the position of the roaming terminal.

17. The method of claim 10, further comprising:
receiving, by the first server, a message for requesting the area event-triggered positioning service from the agent.

18. A network-initiated area event triggered positioning method for a roaming terminal in a mobile communication system, comprising:
receiving, by the roaming terminal, a session initiation message for initiating a trigger session from a first server;
sending, by the roaming terminal, a session start message to the first server;
receiving, by the roaming terminal, a session response message including at least a trigger parameter from the first server;
sending, by the roaming terminal, a positioning initiation message to the first server;
receiving, by the roaming terminal, a measured position value with respect to the roaming terminal from the first server;
comparing, by the roaming terminal, the received measured position value and a position value included in the trigger parameter to check whether an area event trigger condition is met; and
sending, by the roaming terminal, the measured position value to the first server when the area event trigger condition is met.

19. The method of claim 18, wherein the roaming terminal receives the area identities (ids) of an event related to area event-triggered positioning from the first server through the session response message.

20. The method of claim 19, wherein the area ids are obtained by the first server from a second server.

21. The method of claim 19, wherein the area ids correspond to one of ids of cells belonging to the event area, a mobile country code (MCC), a mobile network code (MNC) or a location area code (LAC), or a primary scrambling code number.

22. The method of claim 19, wherein the roaming terminal compares a current area id of the area where the roaming terminal is currently located and the received area ids, and when a first condition is met, the roaming terminal sends a SUPL REPORT message to the first server.

23. The method of claim 19, wherein when the trigger condition included in the trigger parameter indicates that the roaming terminal moves into a particular area or exists in the particular area and if at least one of the received area ids is identical to the current area id of the roaming terminal, the positioning initiation message is transmitted.

24. The method of claim 18, wherein the session initiation message comprises at least trigger type information.

25. The method of claim 24, wherein the trigger type information indicates an area event trigger type.

26. The method of claim 18, wherein the trigger parameter comprises at least a change_area type related to area event-triggered positioning or position values of an event area related to area event-triggered positioning.

27. The method of claim 18, wherein the first server uses a proxy mode.

28. A network-initiated area event triggered positioning method for a roaming terminal in a mobile communication system, comprising:
sending, by a first server, a session initiation message for initiating a trigger session to the roaming terminal;
receiving, by the first server, a session start message including parameters related to setting at least a security session from the roaming terminal;
requesting and obtaining, by the first server, area identities (ids) related to area event-triggered positioning from a third server via a second server;

sending, by the first server, a session response message including at least a trigger parameter and an address of the third server to the roaming terminal; and receiving, by the first server, a calculated position value with respect to the roaming terminal, from the roaming terminal and providing, by the first server, the calculated position value to an agent.

29. The method of claim 28, wherein the first server sends the obtained area ids to the roaming terminal through the session response message.

30. The method of claim 28, wherein the session initiation message comprises trigger type information indicating an area event trigger type.

31. The method of claim 28, wherein the trigger parameter comprises at least a change_area type related to area event-triggered positioning or position values of an event area related to area event-triggered positioning.

32. The method of claim 28, further comprising:
receiving, by the first server, a message for requesting an area event-triggered positioning service from the agent.

33. The method of claim 28, wherein the security session is established between the roaming terminal and the third server by using parameters related to establishment of the security session, and the security session is a session for a positioning procedure between the roaming terminal and the third server.

34. The method of claim 28, wherein the first server is an H-SLC (Home-SUPL Location Center), the second server is a V-SLC (Visited-SLC), and the third server is a V-SPC (Visited-SUPL Positioning Center).

35. The method of claim 28, wherein the first server uses a non-proxy mode, and the third server performs the positioning function for calculating the position of the roaming terminal.

36. A network-initiated area event triggered positioning method for a roaming terminal in a mobile communication system, comprising:
receiving, by the roaming terminal, a session initiation message for initiating a trigger session from a first server;
sending, by the roaming terminal, a session start message including parameters related to at least a security session to the first server;
receiving, by the roaming terminal, a session response message including at least a trigger parameter and an address of a second server from the first server;
sending, by the roaming terminal, a positioning initiation message to the second server;
performing, by the roaming terminal, a positioning procedure by using a security session established with the second server using the security session-related parameters;
receiving by the roaming terminal, a measured position value with respect to the roaming terminal from the second server;
comparing, by the roaming terminal, the received measured position value and a position value included in the trigger parameter to check whether an area event trigger condition is met; and
providing, by the roaming terminal, the measured position value to the first server when the area event trigger condition is met.

37. A method of claim 36, wherein the roaming terminal receives area identities (ids) of an event area related to an area event-triggered positioning from the first server through the session response message.

38. The method of claim 37, wherein the area identities (ids) are obtained by the first server from the second server via a third server, and provided to the roaming terminal.

39. The method of claim 38, wherein the first server is an H-SLC, the second server is a V-SPC, and the third server is a V-SLC.

40. The method of claim 37, wherein the area ids are obtained by the first server from the third server and provided to the roaming terminal.

41. The method of claim 40, wherein the first server is the H-SLC, the second server is an H-SPC, and the third server is the V-SLC.

42. The method of claim 37, wherein the roaming terminal compares an area id of the area where the roaming terminal is currently located and the received area ids, and when trigger condition information contained in the trigger parameter is satisfied, the roaming terminal sends the positioning initiation message to the second server.

43. The method of claim 36, wherein the session initiation message comprises trigger type information indicating area event trigger type information.

44. A network-initiated area event triggered positioning method for a roaming terminal in a mobile communication system, comprising:
sending, by a first server, a session initiation message for initiating a trigger session to the roaming terminal;
receiving, by the first server, a session start message including parameters related to setting at least a security session from the roaming terminal;
requesting and obtaining, by the first server, area identities (ids) related to area event-triggered positioning from a second server;
sending, by the first server, a session response message including at least a trigger parameter and the address of a third server to the roaming terminal; and
receiving, by the first server, a calculated position value with respect to the roaming terminal from the roaming terminal and providing, by the first server, the calculated position value to an agent.

45. The method of claim 44, wherein the first server sends the obtained area ids to the roaming terminal through the session response message.

46. The method of claim 44, wherein the session initiation message comprises trigger type information indicating an area event trigger type.

47. The method of claim 44, further comprising:
receiving, by the first server, a message for requesting the area event-triggered positioning service from the agent.

48. The method of claim 44, wherein the security session is established between the roaming terminal and the third server by using parameters related to establishment of the security session, and the security session is a session for a positioning procedure between the roaming terminal and the third server.

49. The method of claim 44, wherein the first server is an H-SLC (Home-SUPL Location Center), the second server is a V-SLC (Visited-SLC), and the third server is an H-SPC (Home-SPC (SUPL Positioning Center)).

* * * * *